(12) United States Patent
Andersen

(10) Patent No.: US 11,272,693 B2
(45) Date of Patent: Mar. 15, 2022

(54) METHOD OF FILLING FEEDING PANS AS WELL AS A FEEDING SYSTEM

(71) Applicant: LANDMECO. OLGOD A/S, Olgod (DK)

(72) Inventor: Karsten Egelund Andersen, Olgod (DK)

(73) Assignee: LANDMECO. OLGOD A/S

( * ) Notice: Subject to any disclaimer, the term of this patent is extended or adjusted under 35 U.S.C. 154(b) by 481 days.

(21) Appl. No.: 16/304,778

(22) PCT Filed: Apr. 25, 2017

(86) PCT No.: PCT/DK2017/050120
§ 371 (c)(1),
(2) Date: Nov. 27, 2018

(87) PCT Pub. No.: WO2017/202426
PCT Pub. Date: Nov. 30, 2017

(65) Prior Publication Data
US 2020/0323176 A1    Oct. 15, 2020

(30) Foreign Application Priority Data
May 27, 2016 (DK) .......................... PA 2016 70365

(51) Int. Cl.
*A01K 39/012* (2006.01)
(52) U.S. Cl.
CPC ................ *A01K 39/0125* (2013.01)
(58) Field of Classification Search
CPC . A01K 39/012; A01K 39/0125; A01K 39/014
See application file for complete search history.

(56) References Cited

U.S. PATENT DOCUMENTS 2,884,899 A * 5/1959 Jackes .................. A01K 39/012
119/53
3,105,463 A * 10/1963 Pilch .................... A01K 5/0275
119/57.4
(Continued)

FOREIGN PATENT DOCUMENTS

CN   1044381   8/1990
CN   1937912   3/2007
(Continued)

OTHER PUBLICATIONS

Chinese Office Action, Application No. 201780032672.2, dated Sep. 2, 2020 6 pages.

*Primary Examiner* — David J Parsley
*Assistant Examiner* — Morgan T Barlow
(74) *Attorney, Agent, or Firm* — Ware, Fressola, Maguire & Barber LLP

(57) ABSTRACT

A feeding system for freely moving poultry or other small animals including a feeding pan with an outer distribution cone. An overlying horizontal transport channel for feed is provided above the distribution cone having a passage for regular feeding, and the feed passes through the opening at the top of the distribution cone to the inner side of the distribution cone. There is a passage for initial feeding out of the transport channel, arranged such that the feed passes out of the initial feeding passage and impinges on separate chutes externally on the distribution cone having a dividing line between the two chutes.

5 Claims, 7 Drawing Sheets

(56) References Cited

U.S. PATENT DOCUMENTS

| | | | | |
|---|---|---|---|---|
| 3,388,690 A * | 6/1968 | Hostetler | A01K 39/0125 | 119/53 |
| 3,476,087 A * | 11/1969 | Scott | A01K 39/0125 | 119/57.4 |
| 3,511,215 A * | 5/1970 | Myers | A01K 39/0125 | 119/53 |
| 3,554,165 A * | 1/1971 | Carter | A01K 1/0356 | 119/477 |
| 3,811,412 A * | 5/1974 | Murto | A01K 39/0125 | 119/53 |
| 3,971,340 A * | 7/1976 | Allen | A01K 39/0125 | 119/57.4 |
| 4,476,811 A * | 10/1984 | Swartzendruber | A01K 39/0125 | 119/53 |
| 4,940,019 A * | 7/1990 | Coffer | A01K 39/00 | 119/52.2 |
| 4,995,343 A * | 2/1991 | Cole | A01K 39/0125 | 119/53 |
| 5,092,274 A * | 3/1992 | Cole | A01K 39/0125 | 119/57.4 |
| 5,113,797 A * | 5/1992 | van Daele | A01K 39/0125 | 119/53 |
| 5,406,907 A * | 4/1995 | Hart | A01K 39/0125 | 119/53 |
| 5,794,562 A * | 8/1998 | Hart | A01K 39/0125 | 119/52.4 |
| 5,884,581 A * | 3/1999 | Vandaele | A01K 39/0125 | 119/52.4 |
| 5,927,232 A * | 7/1999 | Pollock | A01K 39/0125 | 119/53 |
| 6,173,676 B1 * | 1/2001 | Cole | A01K 39/0125 | 119/57.4 |
| 6,532,895 B1 * | 3/2003 | Andersen | A01K 39/0125 | 119/57.4 |
| 6,655,317 B1 * | 12/2003 | Steadier, Jr. | A01K 39/0125 | 119/53 |
| 7,584,716 B2 * | 9/2009 | Cole | A01K 39/0125 | 119/52.4 |
| 9,591,833 B1 * | 3/2017 | McGregor | A01K 39/0125 | |
| 9,907,294 B2 * | 3/2018 | Otto-Luebker | A01K 39/01 | |
| 10,517,277 B2 * | 12/2019 | Giordano | A01K 39/012 | |
| 2002/0152965 A1 * | 10/2002 | Turner | A01K 39/0125 | 119/53 |
| 2004/0025796 A1 * | 2/2004 | Cole | A01K 39/0125 | 119/55 |
| 2010/0288201 A1 * | 11/2010 | Lush | A01K 39/0113 | 119/52.4 |
| 2012/0079987 A1 * | 4/2012 | Lush | A01K 39/012 | 119/65 |
| 2016/0021853 A1 * | 1/2016 | Septien Prieto | A01K 39/0125 | 119/52.1 |
| 2018/0368372 A1 * | 12/2018 | Andersen | A01K 5/0258 | |
| 2020/0323176 A1 * | 10/2020 | Andersen | A01K 39/0125 | |

FOREIGN PATENT DOCUMENTS

| | | | | |
|---|---|---|---|---|
| CN | 101346064 | 1/2009 | | |
| CN | 201585327 | 9/2010 | | |
| CN | 103782923 | 5/2014 | | |
| CN | 105407713 | 3/2016 | | |
| DK | 2000 00242 | 11/2001 | | |
| EP | 0378039 | 7/1990 | | |
| WO | WO-9742810 A1 * | 11/1997 | | A01K 39/0125 |
| WO | 02/09505 | 2/2002 | | |
| WO | WO-0209505 A1 * | 2/2002 | | A01K 39/0125 |
| WO | 2004002237 | 1/2004 | | |
| WO | WO-2007047228 A2 * | 4/2007 | | A01K 39/0125 |
| WO | 2007072203 | 6/2007 | | |
| WO | 2014180881 | 11/2014 | | |
| WO | 2016018136 | 2/2016 | | |

* cited by examiner

METHOD OF FILLING FEEDING PANS AS WELL AS A FEEDING SYSTEM

CROSS-REFERENCE TO RELATED APPLICATIONS

This application is a U.S. national stage of International Appl. No. PCT/DK2017/050120 filed Apr. 25, 2017, which claimed priority to Danish Appl. No. PA 2016 70365 filed May 27, 2016, which applications are all incorporated herein by reference in their entireties.

TECHNICAL FIELD

The invention relates to a method of filling feeding pans for poultry or other freely moving small animals, such as pigs, goats, rabbits or sheep, as well as a feeding system, wherein the feed is conveyed to a feeding pan from an overlying horizontal transport channel, in which the feed is transported in a direction of transport and forwardly to successive feeding pans along the transport channel, wherein feed is conveyed either to an external side of a distribution cone in the feeding pan, out through a passage in the transport channel for initial feeding, or, alternatively, is conveyed out through a passage in the transport channel for regular feeding and through an opening in the top of the distribution cone to the inner side of the distribution cone.

BACKGROUND

A system for filling feeding pans for poultry or other freely moving small animals is already known from e.g. DK 1152658, and the system described therein has the problem that the feed conveyed to the outer side of the distribution cone drops down along the cone face, so that it is not distributed along the upper rim of the pan. Therefore, the chicks will have limited access to the feed.

DK 2000 00242 U3 discloses a feeding system for feeding poultry, in particular hens and chicks, said system comprising a feed pipe (20) with a plurality of feeding pans, a feed silo or a similar store for feed as well as a transport system for the feed through the feed pipe to the feeding pans, said feed pipe being rotatable about its longitudinal axis and comprising a feed outlet hole for each pan as well as comprising at least one additional feed outlet hole at at least one feeding pan. The at least one additional outlet hole for initial feeding precedes the ordinary outlet hole in the direction of movement of the feed in the pipe, said pipe being rotatable for positioning the one or the other outlet hole in a direction toward the feeding pan.

Therefore, there is a desire for a technique which ensures that a greater part of the feed is distributed along the rim of the feeding pan and, in particular, is conveyed further away from the passage or the opening for initial feeding. There is also a desire for a system which consists of few parts, is easy to operate, and which may be assembled around a transport pipe without the use of tools, and such that this takes place without any risk of error in mounting the system around the transport pipe.

SUMMARY OF THE INVENTION

The object of the invention is achieved by a method of filling one or more feeding pans, which may include conveying feed to a first feeding pan of the one or more feeding pans from an overlying horizontal transport channel, where the feed is transported in a direction of transport along the horizontal transport channel to one of the other one or more feeding pans, and conveying the feed either to an external side of a distribution cone of each of the feeding pans out through a passage for initial feeding in the transport channel, or out through a passage for regular feeding in the transport channel and through an opening in the top of the distribution cone to the inner side of the distribution cone. In accordance with the exemplary method the feed in the transport channel in the direction of transport passes the passage for initial feeding before the feed reaches the passage for regular feeding, the feed passes out through the passage for initial feeding with a speed component in the longitudinal direction of the transport channel corresponding to a feed speed of the feed in the transport channel and a speed component corresponding to free fall, as it is received by an upright dividing line, and as a result of the speed component in the longitudinal direction of the transport channel, the feed is sent in separate flows of material along chute faces on the external face of the distribution cone and is distributed by skidding along respective chute faces to the periphery of the feeding pan.

This ensures that the feed is distributed along two diametrically opposed rim parts disposed on their respective sides of an opening in the top of the distribution cone, thereby making it possible to ensure that an essential part of the periphery of the feeding pan is covered with feed. It is e.g. possible to provide two chute faces, which extend from their respective sides of the partition line and down the distribution cone toward the rim of the feeding pan.

In accordance with the exemplary method embodiments of the invention, the feed is distributed along the chute faces until the feed covers at least part of a farmhouse floor outside the periphery of the feeding pan along a portion of the periphery, so that the farmhouse floor is covered with feed along at least six twelfths of the periphery of the feeding pan.

In accordance with the exemplary method embodiments of the invention, the feed is divided into two flows of material by an additional dividing line disposed in continuation of an upright dividing line between two chute faces.

In accordance with the exemplary method embodiments of the invention, at least part of the additional dividing line and upright dividing line are disposed below the passage for initial feeding.

As mentioned, the invention also relates to a feeding system for freely moving poultry or other small animals comprising a feeding pan, which has an outer distribution cone with a central raised part and a hole in the central raised part as well as a skirt, which fits into the feeding pan within and below the upper edge of a raised rim associated with the feeding pan, and wherein an overlying horizontal transport channel for feed is provided above the distribution cone, a passage for regular feeding out of the transport channel being provided, wherein the feed, when passing through it, passes through the opening at the top of the distribution cone to the inner side of the distribution cone.

The feeding system is characterized in that, prior to the passage for regular feeding in the direction of movement of the feed, there is a passage for initial feeding out of the transport channel, arranged such that the feed passes out of the initial feeding passage and impinges on a separate chutes externally on the distribution cone, a dividing line between the two chutes being present in the distribution cone. Hereby, it is possible to divide the flow of material formed by the feed into separate flows of material, which may be conveyed along the chutes to their respective sides of the opening in the raised part or top of the distribution cone, and, thereby, a considerably greater portion of the rim of the feeding pan may be covered with feed during the initial feeding. This ensures that as many chicks as possible have access to the feed, so that all the chicks will rapidly begin to start eating and to grow. This additionally ensures that all the chicks rapidly learn that the feed is present in the feeding pan all the way around its rim when the initial feeding phase is ended.

In accordance with exemplary system embodiments of the present invention, the chute faces are inclined from the upper part of the distribution cone from the upright dividing line and down toward the rim of the feeding pan, and wherein the inclined chute faces comprise at least three twelfths of the circumference.

In accordance with exemplary system embodiments of the present invention, a screen element for screening the passage for the initial feeding is provided above the extent of the chute faces at the upper part of the distribution cone, wherein the screen element further comprises a detachable attachment for the pipe of the transport channel, an attachment for the distribution cone, and a detachable attachment for a locking ring fixed against rotation relative to the transport channel.

In accordance with exemplary system embodiments of the present invention, the locking ring is in rotatable engagement with the screen element, but axially fixed relative to it, and the locking ring further comprises a radial engagement face cooperating with a radially extending projection on the upper part of the distribution cone, so that the locking ring does not affect the distribution cone upon rotation of the pipe of the transport channel in an angular interval, and so that upon rotation of the pipe of the transport channel in a further angular interval, the locking ring will carry the distribution cone along in the rotation at the engagement of the radial engagement face with the radially extending projection on the distribution cone.

In accordance with exemplary system embodiments of the present invention, the distribution cone is detachably connected with the feeding pan through flexible stays extending downwards from the internal side of the top of the feed cone around the opening in it, said flexible stays being downwardly provided with spearhead-shaped barbs adapted for snap engagement with a rim area of a through opening in an arched central area of the feeding pan shaped as a cone face.

In accordance with exemplary system embodiments of the present invention, the central area of the feeding pan is raised above its rim so as to create an annular fillable feed store between the cone face of the central area and the distribution cone, said feed store being automatically emptied out toward the rim of the feeding pan when the animals eat from the feed there, said spearhead-shaped barbs being flexible in the radial direction so that the feeding pan is easily removable when the stays are affected in the radial direction.

BRIEF DESCRIPTION OF THE DRAWINGS

The invention will now be explained more fully with reference to the drawings, in which.

DETAILED DESCRIPTION OF THE INVENTION

Figure 1:
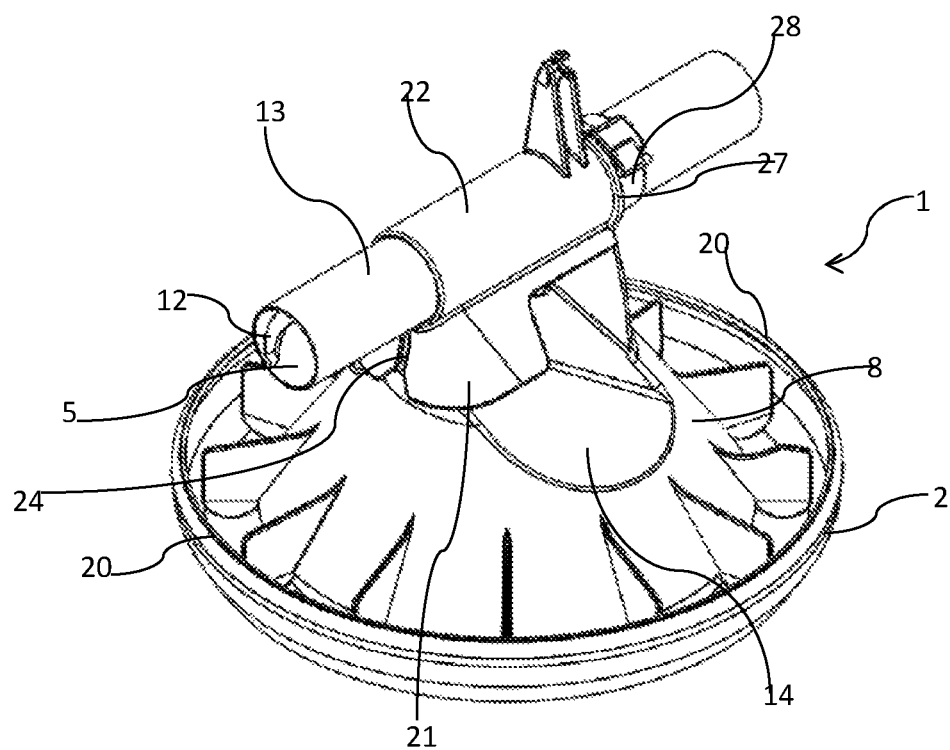
FIG. 1 shows a 3d representation of an example of a feeding pan according to the invention.

A feeding pan 1 for poultry or other freely moving small animals, such as pigs, goats, rabbits or sheep, is shown in FIG. 1.

Figure 2:
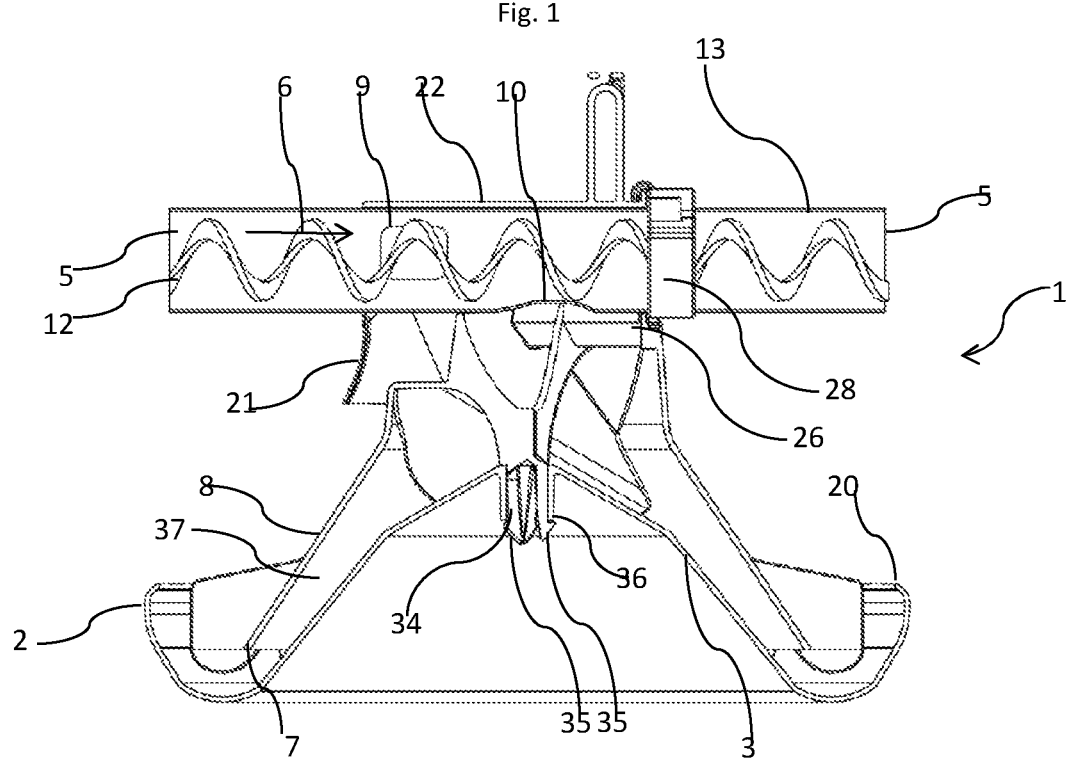
FIG. 2 shows a section through a feeding pan corresponding to the one shown in FIG. 1.
Figure 3:
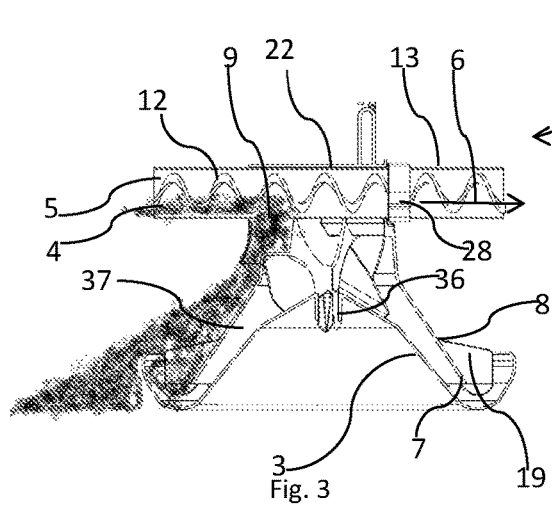
FIG. 3 is a sectional view corresponding to the view in FIG. 2, but where an initial feeding has been initiated.
Figure 4:
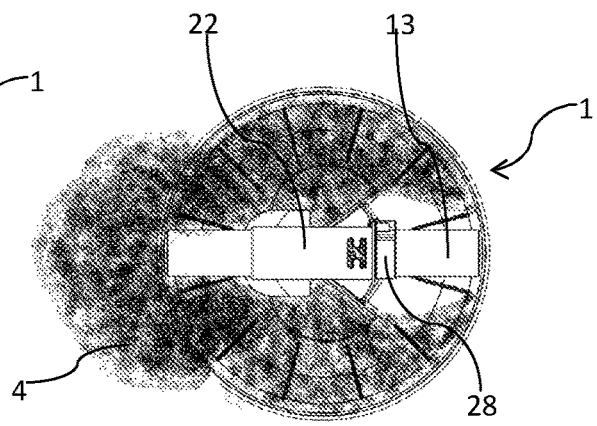
FIG. 4 shows a top plan view of the situation in FIG. 3.

The feeding pan 1 has a round base pan, and the sectional view in FIG. 2 shows that the pan 1 has a raised annular rim 2 and an arched central portion shaped as a cone face 3. The feed 4 is conveyed to the feeding pan from an overlying horizontal transport channel 5, in which the feed is transported in a direction of transport indicated by the arrow 6 and forwardly to successive feeding pans 1 along the transport channel 5. The feed 4 is conveyed to an external side 8 of a distribution cone 7 in the feeding pan, passing out through a passage for initial feeding 9 in the transport channel 5. This is illustrated in FIG. 3 and FIG. 4, where the feeding pan 1 is shown with initial feeding terminated with feed distributed in the pan 1 along the entire rim 2, and a certain amount of feed on the floor. In the transport channel 5, the feed 4 has a speed of movement when the screw line-shaped auger 12 rotates, and, when moving out of the passage for initial feeding 9, the feed 4 will thereby have a horizontal speed component and a vertical speed component. The horizontal speed component imparts an impulse to the feed 4 in the direction of the arrow 6, and, according to the invention, this impulse is used for improved spreading of the feed 4 on the outer side 8 of the distribution cone 7. Alternatively, the feed 4 is conveyed out of the transport channel through a passage for regular feeding 10, as will be seen in FIG. 7. Here, the feed 4 passes on through an opening 11 in the top of the distribution cone 7 to the inner side of the distribution cone 7. As will be seen from FIG. 2, the feed 4 in the transport channel 5 must pass in the direction of transport 6 past the passage for initial feeding 9, before it reaches the passage for regular feeding 10 down through the opening 11.

Figure 7:
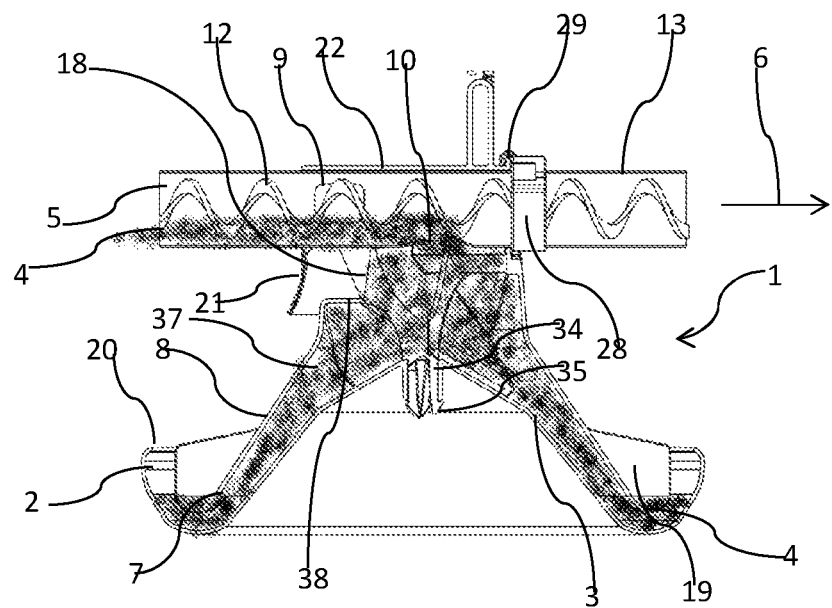
FIG. 7 is a sectional view from the side corresponding to the view in FIG. 2, but now in a state with normal feeding.

The transport channel 5 may be rotated about its longitudinal axis relative to the feeding pans 1 which are connected to it. In an angular position v2 shown in FIG. 16, the passage for initial feeding 9 will be open toward the external side 8 of the distribution cone, and at the same time the passage for regular feeding 10 will be closed. This will also be seen in FIG. 3 and FIG. 4. If the transport channel 5 is rotated to another angular position v1, shown in FIG. 15, relative to the feeding pans 1, the passage for regular feeding 10 is opened down to the opening 11 at the top of the distribution cone 7, and the passage for initial feeding 9 is closed. This is also illustrated in FIG. 7. The rotation of the transport channel takes place via a handle 39, which is shown in FIGS. 17-20, and which is connected with the pipe 13 of the transport channel and is arranged e.g. at the termination of a feeding system e.g. at the end wall of the farmhouse.

The vector speed component of the feed in the longitudinal direction 6 of the transport channel 5 corresponding to a feed speed and the speed component corresponding to free fall mean that the feed is received on chute faces 14, 15 externally on the distribution cone 7 and is distributed by skidding along the chute faces 14, 15 to the periphery of the feeding pan 1. The chute faces 14, 15 are defined by upright stop faces 16, 17 which merge into an upright dividing line 18. The horizontal speed component of the feed 4 out of the initial feeding opening 9 means that the feed 4 impinges on the dividing line 18 and then continues along its respective chute face 14, 15. The purpose of this is that as great a part of the circumference of the feeding pan 1 as possible is hit by the feed 4 at the initial feeding. When the feeding pan 1 has been filled all the way around its periphery, continued supply of feed 4 will mean that the feed 4 continues beyond the edge 2 and lands on the farmhouse floor, as will be seen in FIG. 3. Here, chicks or other small poultry walk about and are inclined by nature to search feed on the surface on which they walk. At the same time, the newly hatched poultry may be so small that it is not able to pick up feed from the feeding pan 1 within the rim 2 thereof, so that initial feeding directly on the floor is a prerequisite for the survival of the animals during the first days in the farmhouse. The poultry, however, grows so quickly in size that within a few days the poultry has a size that allows it to reach the feed 4 directly from the pan 1, and from then on feeding takes place as normal feeding, where the feed 4 is conveyed through the opening at the top 11 of the distribution cone 7 and is spread to the rim area 2 via the internal incorporated cone face 3 of the pan 1.

Figure 6:
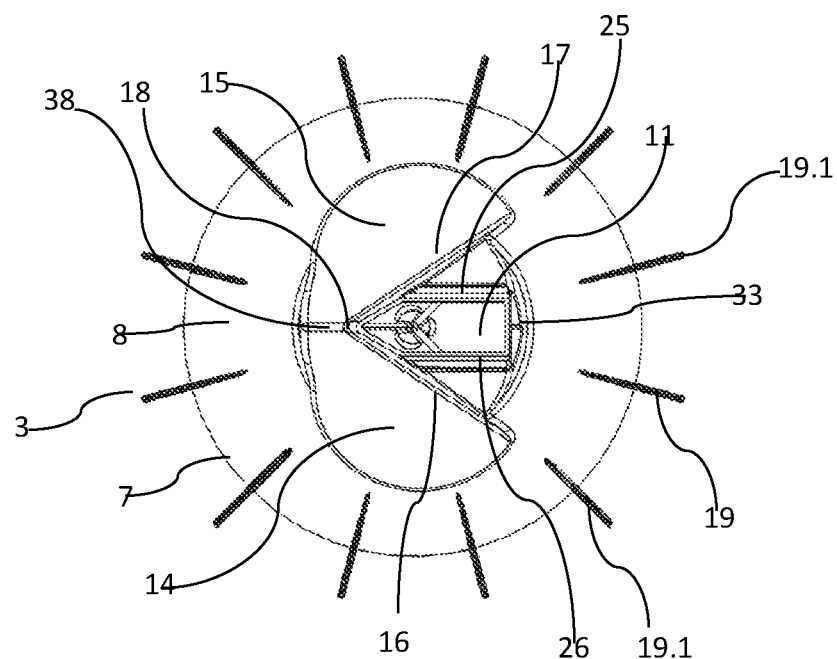

The skid or chute faces 14, 15 and the stop faces 16, 17 must be arranged such that the feed 4 is distributed to as great a part of the periphery of the pan 1 as possible. It will be seen from FIG. 6 that twelve radially extending hampering plates 19 are provided at the bottom of the skirt of the distribution cone, the purpose of which is to hamper the poultry so that the animals do not use the pan 1 as a nest and resting place, resulting in non-access to the feed 4 for the other animals and pollution of the feed 4. It is desired that at least six out of twelve gaps between the hampering plates 19 are filled with feed 4, or six twelfths of the periphery of the pan 1 are filled. However, it is preferred that at least eight twelfths or at least eleven twelfths of the periphery of the feeding pan 1 receive feed 4, which is distributed along the chute faces 14, 15. The feed 4 will accumulate along a portion of the rim 2, typically three twelfths of the rim, as will be seen in FIG. 4, until it runs out on the surrounding floor where it forms a pile, and only when this pile from the initial feeding opening in the pipe cannot receive more feed 4, is the initial feeding completed. Thus, the feed 4 is added until accumulation on the chute faces 14, 15 stops the supply, and the feed 4 will then continue the transport forwards to the next feeding pan 1 arranged on the pipe 13 of the transport channel.

Then, the feed 4 will cover the farmhouse floor outside the periphery of the feeding pan 1 along the stated part thereof, while the inner rim of the pan 1 is covered with feed 4 as far as possible all the way around.

Thus, the feeding pan 1 of the feeding system comprises the outer distribution cone 7, which, with its skirt, fits into the feeding pan 1 within and below the upper edge 20 of the raised rim 2 of the pan, so that feed 4, which is fed through the opening 11 of the distribution cone 7 at the top thereof and is fed to its inner sides, will not flow over the edge 20 at any time. The chutes 14, 15 pass on their respective sides of the top of the distribution cone 7 and the opening 11 therein, and their extent begins at an additional dividing line 38 disposed just below the passage for the initial feeding 9 and in continuation of the upright dividing line 18. The chutes 14, 15 are inclined with a skid angle suitable for the feed 4 toward the bottom of the feeding pan 1, and comprises at least three twelfths of the circumference, preferably not less than nine twelfths of the circumference of the distribution cone 7. This ensures that practically all parts of the rim 2 of the feeding pan 1 are coated with feed 4 on its internal side. The twelve hampering plates 19 are equidistantly spaced and are of the same shape, two of them having a depressed upper rim 19.1, which may be instrumental in causing a larger area of the feeding pan rim 2 to be coated with feed 4 during the initial feeding. A rim section between two hampering plates 19 then corresponds to 30 degrees of the total circumference of 360 degrees. Two twelfths are the same as 60 degrees, three twelfths are the same as 90 degrees, and thus the relation between twelfths and degrees continues.

If the transport channel 5 is allowed to be disposed at an arbitrary height above the bottom of the feeding pan, the task of ensuring a suitable skid angle for the chute faces 14, 15 in order to fill the feeding pan 1 along and outside the entire rim 2, is a trivial problem, but at the same time a relatively low overall mounting height is desired, so that the farmer can relatively easily move about in the farmhouse irrespective of the many transport channels 5 and associated pipes 13.

Figure 5:
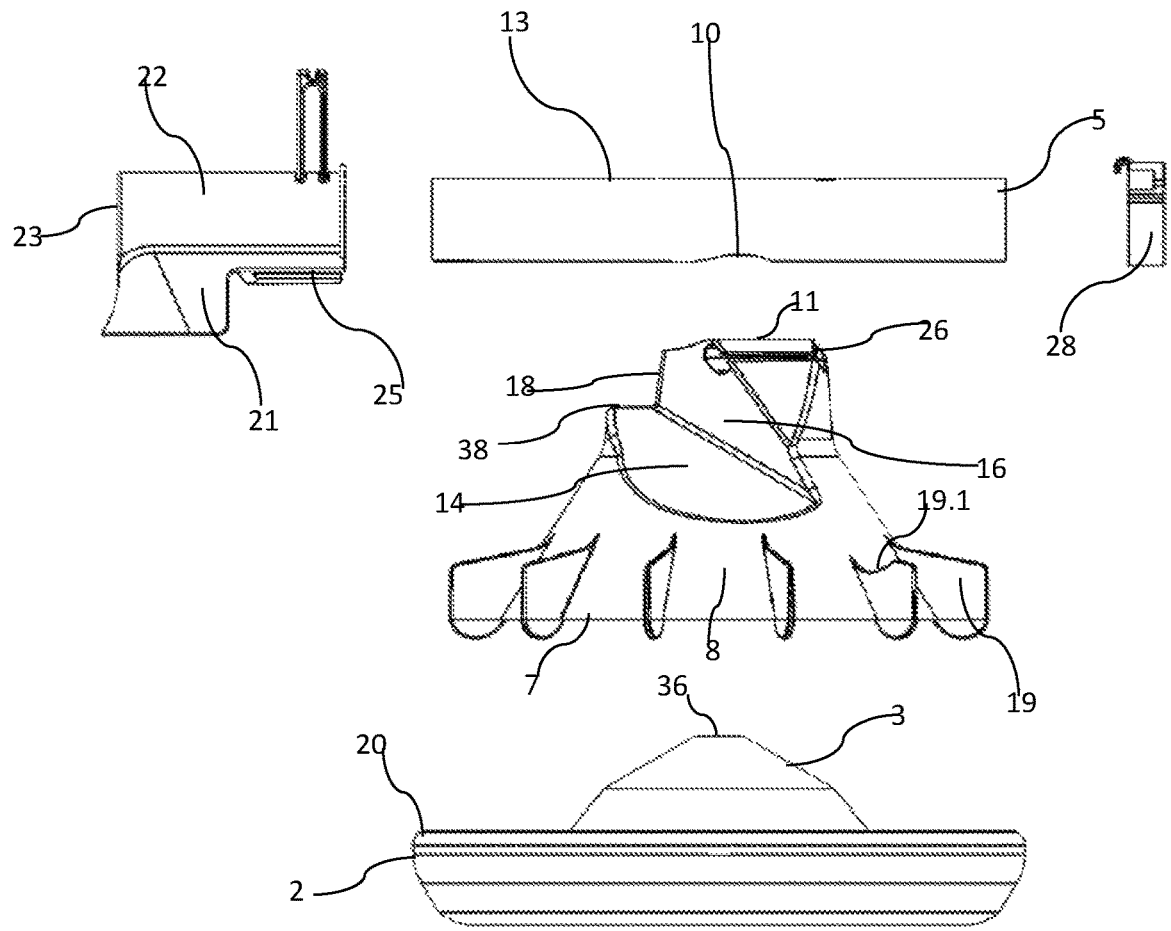
FIG. 5 shows an exploded drawing in lateral view of the feeding pan of FIG. 1, FIG. 6 the outer cone seen alone and from above.
Figure 8:
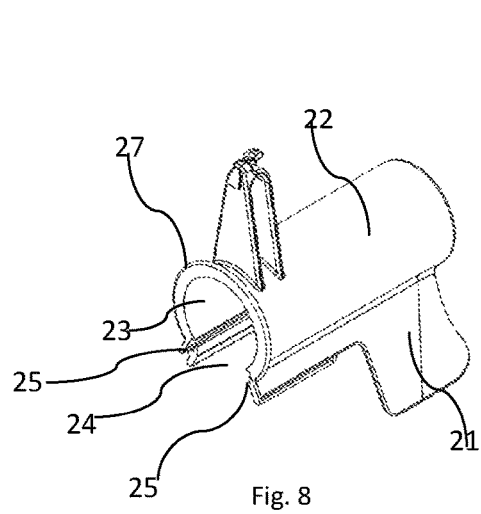
FIG. 8 is a 3d representation of the screen part.
Figure 9:
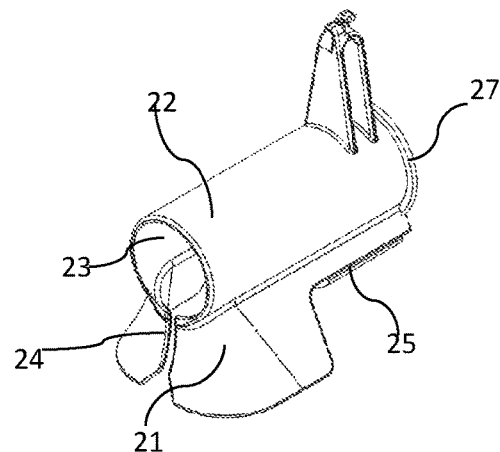
FIG. 9 is the same screen part as shown in FIG. 8, but seen from another angle.

A screen element 21 for screening the passage 9 for the initial feeding is provided above the extent of the chutes 14, 15 at the top of the distribution cone. The screen element is seen best in FIG. 5, FIG. 8 and FIG. 9. The screen element 21 has a detachable attachment 22 for the pipe 13 of the transport channel 5. The attachment 22 comprises a slitted pipe 23 with an internal diameter essentially corresponding to the external diameter of the pipe 13 of the transport channel. The slit 24, which extends in the entire length of the slitted pipe 23, allows the slitted pipe 23 to be snapped around the pipe 13 of the transport channel, so that it fits tightly against the surface thereof. The slitted pipe 23 will have a wide slit in a central area of the attachment 22, so that the feed may pass therethrough and down into the opening 11, or down on the outer chute faces 15, 14 of the distribution cone. The screen element 21 extends downwards from the area around the wide slit, so that it is not possible to get a finger into the passage 9 for the initial feeding.

At downwardly facing edge parts along the slit 24, opposite the screen element 21, the slitted pipe 23 has gripping grooves 25 which cooperate with shape-complementary grooves 26 in the upper part of the distribution cone along the opening 11. The gripping grooves 25 may be slid into the shape-complementary grooves 26 in the distribution cone 7 so as to form a tight-fitting attachment between the two parts. When the distribution cone 7 is slid into position and receives the grooves 25, this takes place by a mutual movement between distribution cone 7 and screen element 21 in parallel with the pipe 13. With the attachment 22 snapped around the pipe 13, the slit 24 will hereby be locked, so that the attachment 22 cannot be removed from the pipe 13 again once the distribution cone 7 has been mounted on it. This method of assembly is both simple and straightforward and can be made without the use of tools.

Figure 10:
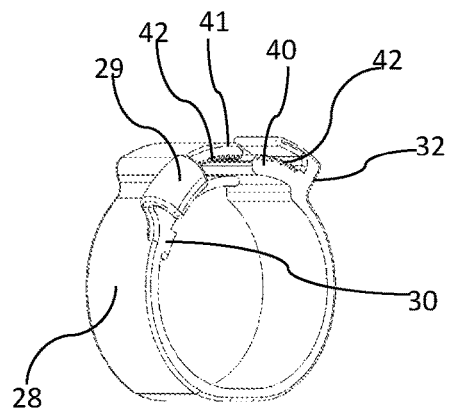
FIG. 10 shows the locking ring in a 3d representation.
Figure 11:
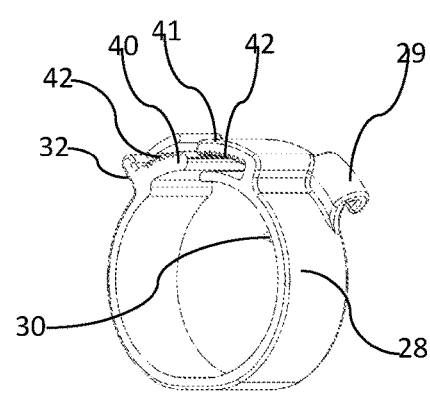
FIG. 11 is the locking ring shown in FIG. 10, but seen from another angle.

Further, around its terminating rim at the gripping grooves 25, the slitted pipe 23 of the screen element 21 has an outwardly directed flange 27, which serves as a detachable attachment for a locking ring 28, shown in FIGS. 10 and 11. The locking ring 28 comprises a hook 29 which grips the flange 27 when the locking ring 28 is mounted in addition to the total system comprising the screen element 21 and the distribution cone 7. As the hook 29 grips the flange 27, it may be ensured that the locking ring 28 and the slitted pipe 23 cannot be displaced axially relative to each other, but may still be rotated relative to each other about their common longitudinal axis. The locking ring 28 moreover comprises an inwardly directed boss 30 which forms a shape-complementary fit with a recess or locking opening 31 in the pipe 13 of the transport channel. When the boss 30 is placed in the locking opening 31, the pipe 13 and the locking ring 28 will be fixed relative to each other, both in the axial direction and in terms of rotation. The boss 30 and the locking opening 31 are asymmetrical, so that the locking ring can only be mounted with the boss 30 in the locking opening 31 when the locking ring 28 is oriented correctly relative to the direction of transport 6. This ensures that the distribution cone 7 and the attachment 22 will always be seated correctly relative to the initial feeding and regular feeding openings of the pipe 13.

Figure 13:
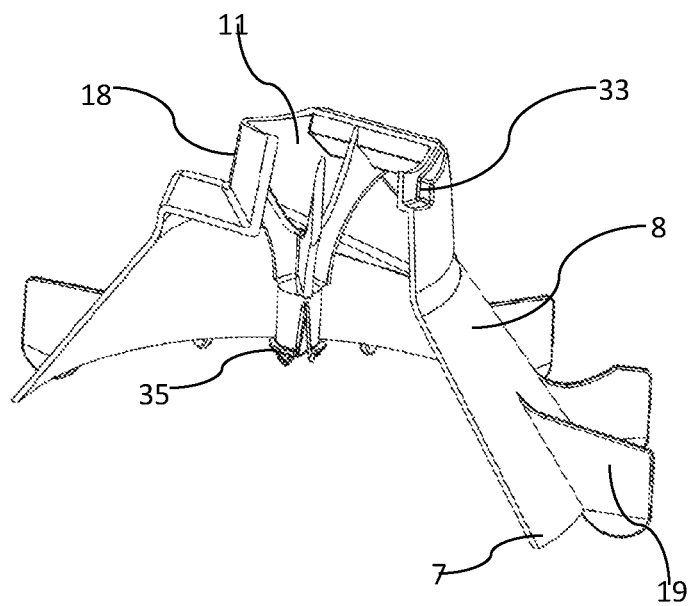
FIG. 13 shows the cone cut through, but in a 3d representation.
Figures 14, 15, 16:
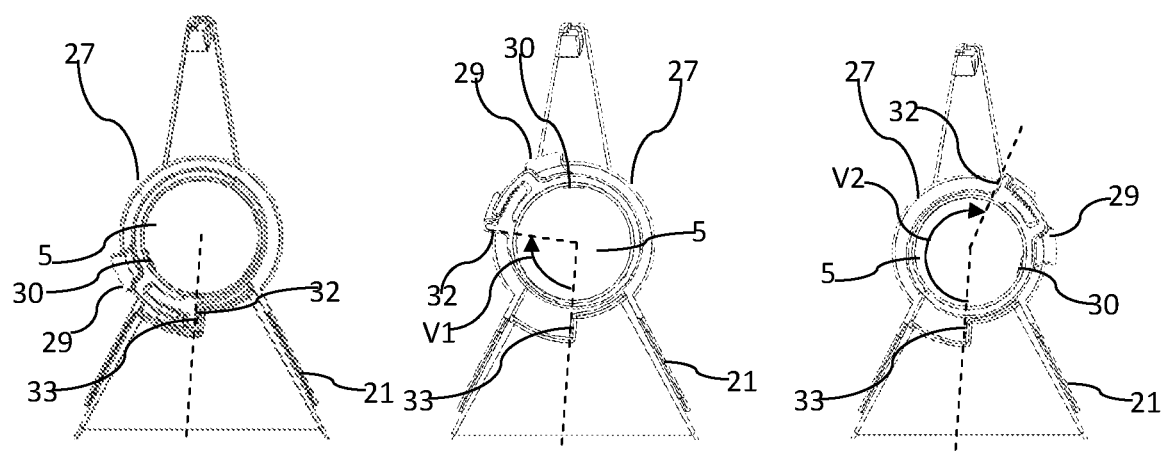
FIG. 14 shows the assembly of pipe, top and cone from the end in a first position.
FIG. 15 is the same elements as in FIG. 14, but now with the pipe and the ring rotated to a position for filling of the feeding pan.
FIG. 16 is the same elements as in FIG. 15, but now with the pipe and the ring rotated for initial feeding and covering of the area around the feeding pan with feed.

The locking ring 28 additionally has a radial engagement face 32 adapted to cooperate with a radially extending projection 33, shown in FIG. 13, on the upper part of the distribution cone 7, so that the locking ring 28 does not affect the distribution cone 7 by rotation of the transport channel 5 in an angular interval. Such angular positions are shown in FIGS. 15 and 16 and indicated by V1 and V2.

Figure 17:
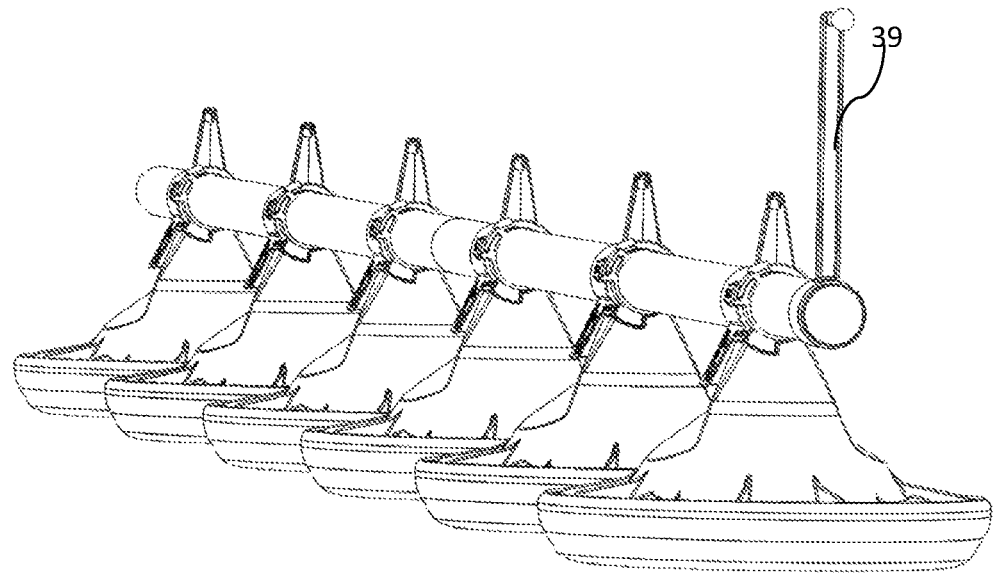
FIG. 17 shows a plurality of feeding pans on a length of pipe in the same position as shown in FIG. 15.
Figure 18:
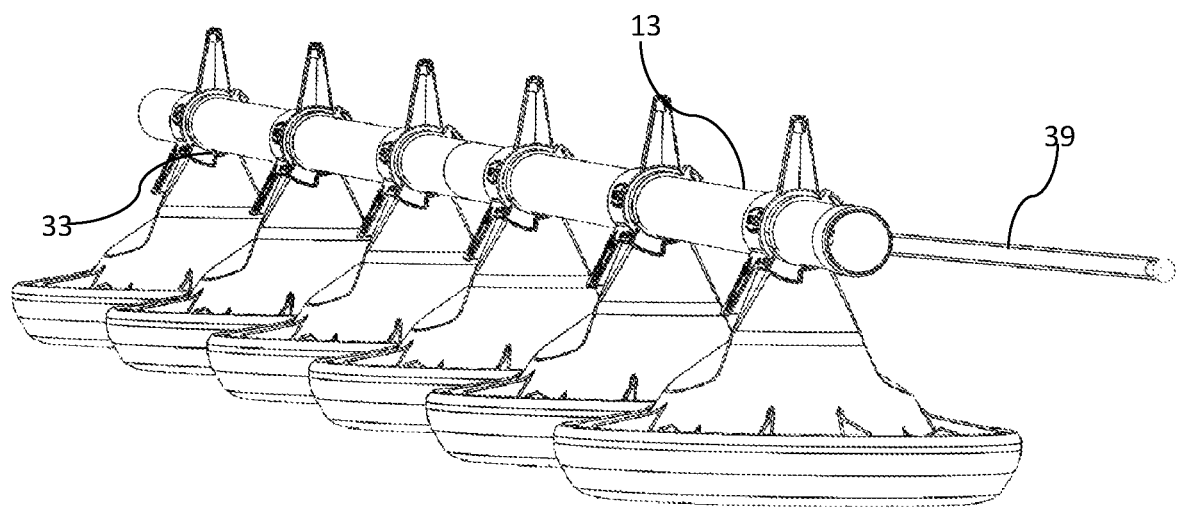
FIG. 18 shows the feeding pans of FIG. 17, but now in the same position as shown in FIG. 16.
Figure 19:
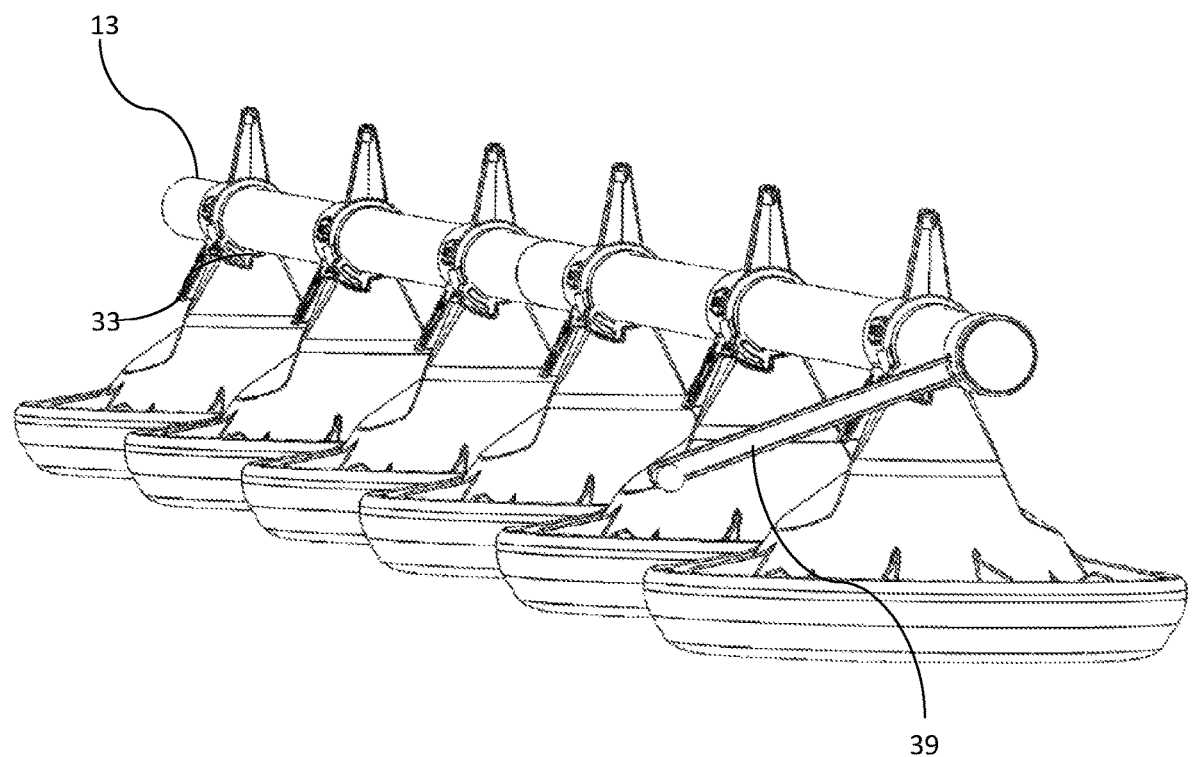
FIG. 19 shows the feeding pans of FIG. 17, but now in the same position as indicated in FIG. 14.
Figure 20:
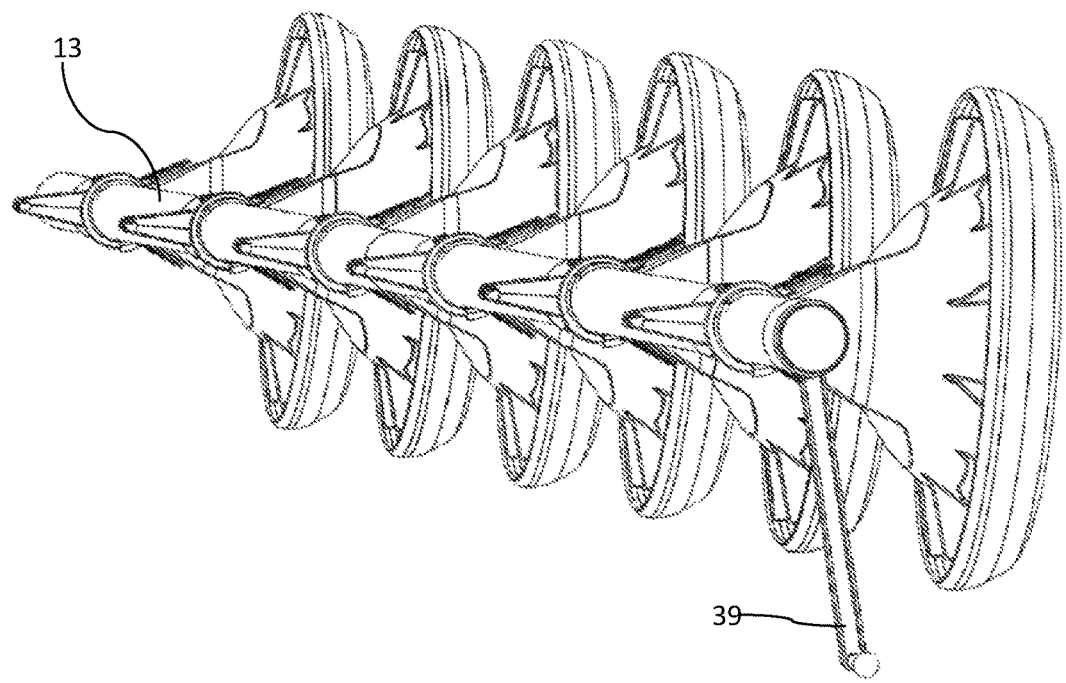
FIG. 20 shows the feeding pans rotated a distance together with the pipe to a washing position.

FIGS. 17 to 20 show part of a feed line in a three-dimensional representation, where a plurality of feeding pans is shown in succession on a feed pipe. The angular intervals are illustrated in FIG. 17 and FIG. 18, where FIG. 17 shows the handle 39 and thereby the pipe in an angular position like the angular position shown in FIG. corresponding to the setting of the system for normal feeding, and where FIG. 18 shows the handle and the angular rotation of the pipe like in FIG. 16, which corresponds to a setting of the system for initial feeding. In these angular positions, it will be seen that the pipe is rotated without the feeding pan 1 being rotated as well. FIG. 19 shows an angular position of the pipe and the handle 39 corresponding to the angular position shown in FIG. 14, and, finally, further rotation of the handle 39 and the pipe is shown in FIG. 20. With this rotation of the transport channel 5 in the additional angular interval, the engagement face 32 of the locking ring will engage the radial projection 33 of the distribution cone, and the rotation of the pipe 13 of the distribution channel causes the distribution cone 7 and the rest of the feeding pan 1 to be rotated too. Hereby, it is possible to rotate all the feeding pans mounted on the pipe of a transport channel 5 to a position in which they are easy to clean, e.g. with the bottom of the pan 1 in a vertical position up from the farmhouse floor, as will be seen in FIG. 20. With this rotation of the pipe relative to the feeding pan 1, both openings out of the pipe will be blocked, and this also means that flushing of the feeding pan 1 with water under pressure may be performed without water penetrating into the pipe, thereby protecting the internal area of the pipe from being soiled during the cleaning of the feeding pans.

The locking ring 28 is initially open, as shown in FIG. 10 and FIG. 11. The ring 28 is made of a flexible material, so that it may be opened even more, as a lower locking tongue 40 may be pressed away from an upper locking tongue 41, so that the ring 28 is mountable on the pipe 13. The locking tongues 40, 41 have shape-complementary barbs 42, so that the locking tongues 40, 41 will cause the barbs to lockingly engage each other when the opening of the ring is pressed together. This may be done without tools.

The distribution cone 7 is detachably connected with the feeding pan 1 through flexible stays 34 (see FIG. 2), which extend downwards from the internal side of the top of the feed cone around the opening 11 therein, as will be seen e.g. in FIG. 2. At the bottom, the flexible stays 34 are provided with spearhead-shaped barbs 35, which are adapted for snap engagement with a rim area of a through opening 36 in a central area of the cone face 3 of the feeding pan 1. When the distribution cone 7 and the pan 1 are to be separated, this is relatively easy to do by pressing the spearhead-shaped barbs 35 radially together, which may easily be done with a suitable tool, which may e.g. consist of a pipe (not shown) with an internal conical rim at its one end. This method of separation and assembly is not destructive and may be carried out many times without causing any damage or noticeable wear to the parts, which contributes to ensuring long life and great flexibility of the system.

The central area of the feeding pan 1 is shaped as a cone face 3 and is thus raised above its rim 2, thereby creating an annular, fillable feed store 37 between the cone shape of the central area and the distribution cone 7, which will automatically be emptied out toward the rim 2 of the feeding pan 1 when the animals eat from the feed 4 there.

Figure 12:
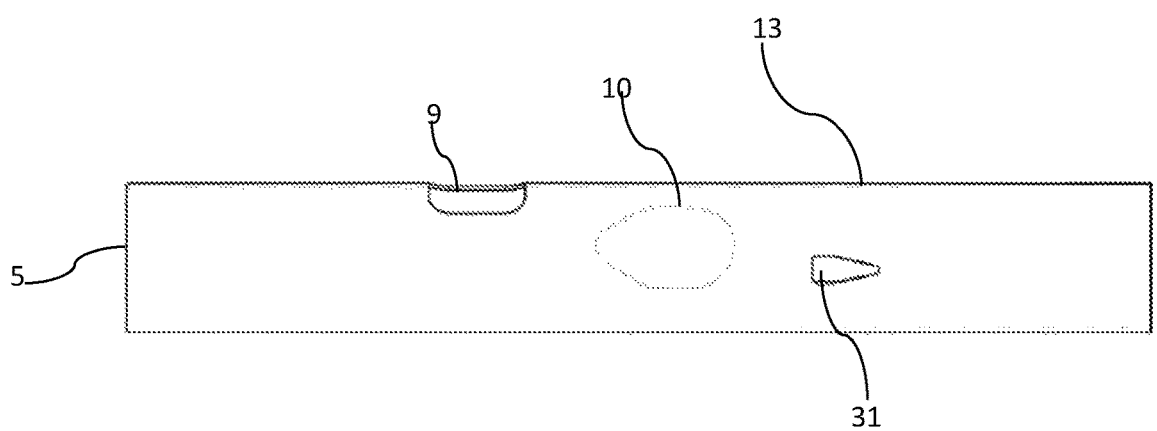
FIG. 12 is a lateral view of the pipe seen from the side, with concealed contours shown in dashed weakened line.

FIG. 2 and FIG. 12 show a pipe 13 for use as a transport channel 5 in a feeding system. The pipe 13 accommodates a screw line-shaped member 12 which, upon rotation, causes the feed to be fed forwards in the pipe 13, said pipe 13 having a radial opening 9 for feed passage out of the pipe for initial feeding, there being subsequently in the direction of transport 6 a radial opening 10 for feed passage out of the pipe 13 for regular feeing. The pipe 13 may have any length corresponding to e.g. the length of a farmhouse system, and the pipe may additionally be composed of suitable lengths, as is well-known for long pipe members. The screw line-shaped member or auger or worm is also a well-known element and is here made of an elongate piece of flat iron. At an end of the pipe, there is provided a motor, e.g. an electric motor, which imparts a rotational movement to the auger, which movement will propagate to the entire auger in the entire length of the pipe. Hereby, the feed may be transported all the way and drop down into feeding pans, where they are mounted on the pipe.

The two openings 9, 10 are arranged at an axial distance from each other in the longitudinal direction of the pipe, and they are moreover positioned at a mutual angle of rotation in the circumference of the pipe relative to each other, the shortest angle of rotation from the regular feeding opening to the initial feeding opening being opposite the direction of rotation of the screw line-shaped member in the pipe, when it is rotated for propulsion of the feed. This ensures that the feed in the pipe does not accumulate against the passage 9 for the initial feeding, when this is not in use. It is also well-known that openings of the type required for creating a passage for the feed will weaken the pipe, and therefore it is necessary to have a certain distance between them.

REFERENCE NUMERALS

1 Feeding pan
2 Annular rim
3 Cone face
4 Feed
5 Overlying transport channel
6 Direction of transport
7 Distribution cone
8 External face of distribution cone
9 Passage for initial feeding
10 Passage for regular feeding
11 Opening in distribution cone top
12 Screw line-shaped member
13 Transport channel pipe
14 Chute face
15 Chute face
16 Stop face
17 Stop face
18 Upright dividing line
19 Hampering faces
20 Upper edge
21 Screen element
22 Attachment for pipe
23 Slitted pipe
24 Slit
25 Gripping grooves
26 Shape-complementary grooves
27 Flange
28 Locking ring
29 Hook
30 Boss
31 Locking opening
32 Radial engagement face
33 Radially extending projection
34 Flexible stays
35 Barbs
36 Opening
37 Fillable feed store
38 Additional dividing line
39 Handle
40 Lower locking tongue
41 Upper locking tongue
42 Barbs

The invention claimed is:

1. A feeding system, comprising:
at least one feeding pan, each feeding pan having an outer distribution cone with a central raised part, an opening in the central raised part, and a skirt configured to fit into the feeding pan within and below an upper edge of a raised rim associated with the feeding pan;
an overlying horizontal transport channel configured to provide feed above the distribution cone having a passage for regular feeding being provided such that the feed when passing therethrough passes through the opening in the central raised part of the distribution cone to the interior side of the distribution cone;
a passage for initial feeding prior to the passage for regular feeding in-relative to the direction of movement of the feed, arranged such that the feed passes out of the initial feeding passage and impinges on two separate chute faces on the external face of the distribution cone; and
an upright dividing line between the two separate chute faces positioned on the distribution cone;
wherein the chute faces are inclined from the upper part of the distribution cone from the upright dividing line and down toward the rim of the feeding pan, and wherein the inclined chute faces comprise at least three twelfths of the circumference of the rim of the feeding pan; and
wherein a screen element for screening the passage for the initial feeding is provided above the extent of the chute faces at the upper part of the distribution cone, wherein the screen element further comprises a detachable attachment for the pipe of the transport channel, an attachment for the distribution cone, and a detachable attachment for a locking ring fixed against rotation relative to the transport channel.

2. The feeding system according to claim 1, wherein the locking ring is in rotatable engagement with the screen element, but axially fixed relative to the screen element, and the locking ring further comprises a radial engagement face cooperating with a radially extending projection on the upper part of the distribution cone, so that the locking ring does not affect the distribution cone upon rotation of the pipe of the transport channel in an angular interval, and so that upon rotation of the pipe of the transport channel in a further angular interval, the locking ring will carry the distribution cone along in the rotation at the engagement of the radial engagement face with the radially extending projection on the distribution cone.

3. The feeding system according to claim 2, wherein the distribution cone is detachably connected with the feeding pan through flexible stays extending downwards from the internal side of the top of the feed cone around the opening in the feeding pan, said flexible stays being downwardly provided with spearhead-shaped barbs adapted for snap engagement with a rim area of a through opening in an arched central area of the feeding pan shaped as a cone face.

4. The feeding system according to claim 3, wherein the central area of the feeding pan is raised above the rim of the feeding pan so as to create an annular fillable feed store between the cone face of the central area and the distribution cone, said feed store being automatically emptied out toward the rim of the feeding pan when the animals eat from the feed there, said spearhead-shaped barbs being flexible in the radial direction so that the feeding pan is removable when the stays are affected in the radial direction.

5. The feeding system according to claim 2, wherein the transport channel comprises a pipe having a radial passage for feed out of the pipe for initial feeding and subsequently in the direction of transport a radial passage for feed out of the pipe for regular feeding, said pipe blocking the access from the feeding pan to the two radial passages upon the pipe's rotation relative to the feeding pan forwards toward the further angular interval.

\* \* \* \* \*